United States Patent
Suzuki et al.

(10) Patent No.: US 9,401,736 B2
(45) Date of Patent: Jul. 26, 2016

(54) RADIO COMMUNICATION APPARATUS, RADIO COMMUNICATION SYSTEM, AND RADIO COMMUNICATION METHOD

(71) Applicants: Kazumasa Suzuki, Chiyoda-ku (JP); Hiroyasu Sano, Chiyoda-ku (JP); Akinori Taira, Chiyoda-ku (JP)

(72) Inventors: Kazumasa Suzuki, Chiyoda-ku (JP); Hiroyasu Sano, Chiyoda-ku (JP); Akinori Taira, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/428,786

(22) PCT Filed: Sep. 21, 2012

(86) PCT No.: PCT/JP2012/074224
§ 371 (c)(1),
(2) Date: Mar. 17, 2015

(87) PCT Pub. No.: WO2014/045402
PCT Pub. Date: Mar. 27, 2014

(65) Prior Publication Data
US 2015/0263773 A1    Sep. 17, 2015

(51) Int. Cl.
*H04B 1/38*     (2015.01)
*H04B 1/3822*   (2015.01)
(Continued)

(52) U.S. Cl.
CPC .......... *H04B 1/3822* (2013.01); *H04B 7/04* (2013.01); *H04L 67/12* (2013.01); *H04W 4/04* (2013.01);
(Continued)

(58) Field of Classification Search
CPC ........ H04B 1/3822; H04B 7/04; H04L 67/12; H04W 4/04; H04W 72/04; H04W 4/046; H04W 72/0453; H04W 72/08
See application file for complete search history.

(56) References Cited

U.S. PATENT DOCUMENTS 5,533,025 A    7/1996  Fleek et al.
6,252,859 B1 * 6/2001  Rhodes ............... H04W 84/08
                                          370/329

(Continued)

FOREIGN PATENT DOCUMENTS

JP    06-334630 A    12/1994
JP    08-125583 A     5/1996
(Continued)

OTHER PUBLICATIONS

U.S. Appl. No. 14/423,555, filed Feb. 24, 2015, Akinori Taira.
(Continued)

*Primary Examiner* — Jean B Corrielus
(74) *Attorney, Agent, or Firm* — Oblon, McClelland, Maier & Neustadt, L.L.P.

(57) ABSTRACT

A radio communication apparatus includes antennas, transceiver units respectively connected to the antennas, and a radio control unit that controls the transceiver units, simultaneously inputs same transmission data to the transceiver units, and instructs, every switching cycle of frequency hopping, the transceiver units to start check processing for an idle state of frequency channels. The transceiver units respectively include hopping control units that switch the frequency channels every fixed time in synchronization with a communication partner and control such that each of the transceiver units uses a different frequency at the same hour. When determining that a frequency channel is in an idle state before a predetermined time elapses from the start of the check processing for an idle state, the transceiver units transmit the transmission data to the communication partner using the frequency channel.

7 Claims, 4 Drawing Sheets

(51) Int. Cl.
*H04L 29/08* (2006.01)
*H04W 72/04* (2009.01)
*H04W 72/08* (2009.01)
*H04B 7/04* (2006.01)
*H04W 4/04* (2009.01)
*H04W 72/00* (2009.01)

(52) U.S. Cl.
CPC .......... *H04W 72/04* (2013.01); *H04W 72/0453* (2013.01); *H04W 72/08* (2013.01); *H04W 4/046* (2013.01); *H04W 72/00* (2013.01)

(56) References Cited

U.S. PATENT DOCUMENTS

| | | | |
|---|---|---|---|
| 8,363,693 B2 | 1/2013 | Fujiwara | |
| 2003/0222818 A1* | 12/2003 | Regnier | H01Q 1/246 342/383 |
| 2005/0020299 A1* | 1/2005 | Malone | H04W 48/18 455/552.1 |
| 2005/0059347 A1* | 3/2005 | Haartsen | H04W 16/14 455/41.2 |
| 2006/0217121 A1* | 9/2006 | Soliman | H04W 16/32 455/446 |
| 2008/0247336 A1 | 10/2008 | Sugitani | |
| 2009/0029710 A1 | 1/2009 | Ochiai et al. | |
| 2009/0215400 A1* | 8/2009 | Chang | H04W 48/08 455/67.14 |
| 2009/0296643 A1 | 12/2009 | Cave et al. | |
| 2010/0118723 A1 | 5/2010 | Pani et al. | |
| 2012/0021754 A1 | 1/2012 | Ogawa et al. | |
| 2015/0139214 A1* | 5/2015 | Noh | H04B 7/0452 370/338 |

FOREIGN PATENT DOCUMENTS

| | | |
|---|---|---|
| JP | 2002-191073 A | 7/2002 |
| JP | 2002-320271 A | 10/2002 |
| JP | 2005-286753 A | 10/2005 |
| JP | 2009-005037 A | 1/2009 |
| JP | 2011-120298 A | 6/2011 |
| JP | 2011-229126 A | 11/2011 |
| JP | 2012-508531 A | 4/2012 |
| WO | WO 2010/026761 A1 | 3/2010 |

OTHER PUBLICATIONS

International Search Report issued Oct. 23, 2012 in PCT/JP2012/074224 Filed Sep. 21, 2012.
"Part 11: Wireless LAN medium access control (MAC) and physical layer (PHY) specifications", IEEE Standard for Information Technology, IEEE Std 802.11, 2007, 48 Pages.
Supplementary European Search Report issued Apr. 14, 2016 in European Patent Application No. 12884849.6.

\* cited by examiner

RADIO COMMUNICATION APPARATUS, RADIO COMMUNICATION SYSTEM, AND RADIO COMMUNICATION METHOD

FIELD

The present invention relates to a radio communication apparatus, a radio communication system, and a radio communication method.

BACKGROUND

In recent years, attention has been paid to a radio train control system (CBTC system: Communication-Based Train Control System) that performs radio communication between a train and a radio base station set along a railroad track and performs operation control and speed control for the train on the basis of information transmitted by the radio communication. Compared with a conventional train operation control system by a fixed block section, the CBTC system is advantageous in terms of introduction costs and maintenance costs because a track circuit is unnecessary. Further, a flexible block section free from a fixed section can be established. Therefore, the CBTC system is also advantageous in terms of operation costs because it is possible to increase operation density of trains.

In general, in the CBTC system, an ISM (ISM: Industry Science Medical) band, which does not require a license, is often used for radio communication between the ground and a train from the viewpoint of costs. However, the ISM band is widely used in other systems such as a wireless LAN (Local Area Network) and a Bluetooth (registered trademark). The use of the other systems in trains and in buildings along a railroad line could be a significant interference source for the CBTC system.

As one of communication systems excellent in interference resistance, there is an FHSS (Frequency Hopping Spread Spectrum) system defined in, for example, IEEE (Institute of Electrical and Electronic Engineers) 802.11 (see Non Patent Literature 1). The FHSS system is a system for switching a carrier frequency in use at fixed time intervals to perform communication. Therefore, when an interference source is present in a specific frequency channel or in an environment where a frequency at which interference is present changes with time, the FHSS system avoids interference to realize stable communication by repeatedly transmitting the same data while switching a carrier frequency.

A radio communication apparatus disclosed in Patent Literature 1 further includes, in the FHSS system, a plurality of antennas and uses different hopping sequences synchronizing with one another among the antennas to thereby enable communication by using at least any one of channels and improve interference resistance while maintaining the response speed.

CITATION LIST

Patent Literature

Patent Literature 1: Japanese Patent Application Laid-Open No. 2009-5037

Non Patent Literature

Non Patent Literature 1: IEEE Std 802.11-2007, "Part 11: Wireless LAN Medium Access Control (MAC) and Physical Layer (PHY) Specifications", 2007

SUMMARY

Technical Problem

However, according to the technology described in Patent Literature 1, OFDM (Orthogonal Frequency Division Multiplexing) is used and communication is performed by causing a frequency channel in use to hop for each OFDM symbol. In the system described in Patent Literature 1, presence or absence of an interference source in a channel in use during transmission is not taken into account. Remedy of a bit error due to interference is expected mainly by interleave and error correction. Therefore, in a situation in which an interference source occupies a line at a fixed or higher ratio, there is a problem in that collision with the interference source occurs with high probability and stable communication cannot always be performed.

The present invention has been devised in view of the above and it is an object of the present invention to obtain a radio communication apparatus, a radio communication system, and a radio communication method capable of avoiding interference and performing stable communication with high transmission efficiency.

Solution to Problem

In order to solve the above problems and achieve the object, the present invention relates to a radio communication apparatus that performs frequency hopping, including: a plurality of antennas; a plurality of transceiver units respectively connected to the antennas; and a radio control unit that controls the transceiver units, simultaneously inputs same transmission data to the transceiver units, and instructs, every switching cycle of the frequency hopping, the transceiver units to start check processing for checking an idle state of a frequency channel used by the transceiver units, wherein the transceiver units include a hopping control unit that controls the frequency hopping for switching a frequency channel every fixed time in synchronization with a communication partner and controls such that each of the transceiver units uses a different frequency at a same hour, and the transceiver units carry out the check processing for checking an idle state on a basis of an instruction of the radio control unit and, when determining that a frequency channel used by the transceiver units is in an idle state before a predetermined time, which is shorter than the fixed time, elapses from a start of the check processing for checking an idle state, transmit the transmission data to the communication partner by using the frequency channel.

Advantageous Effects of Invention

The radio communication apparatus, the radio communication method, and the radio communication method according to the present invention attain an effect that it is possible to avoid interference and perform stable communication with high transmission efficiency.

DESCRIPTION OF EMBODIMENTS

Exemplary embodiments of a radio communication apparatus, a radio communication system, and a radio communication method according to the present invention are explained in detail below with reference to the drawings. Note that the present invention is not limited by the embodiments.

First Embodiment

Figure 1:
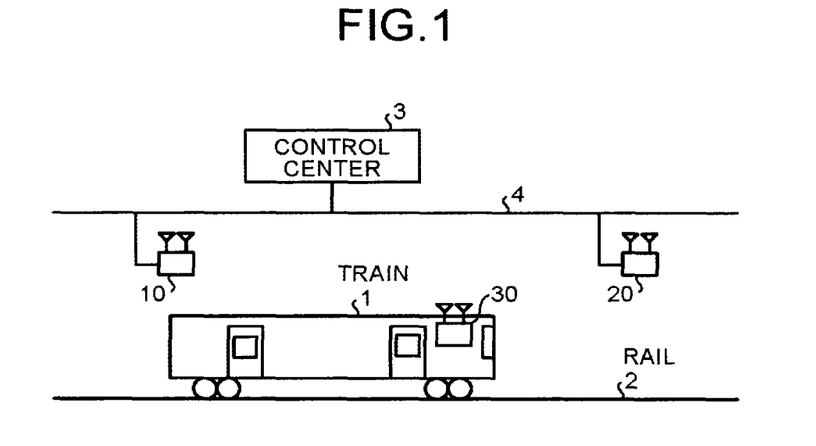
FIG. 1 is a diagram of a configuration example of a radio communication system in a first embodiment.

FIG. 1 is a diagram of a configuration example of a first embodiment of the radio communication system according to the present invention. A radio communication apparatus 30 in the present embodiment is mounted on a train 1 and the train 1 travels on a rail 2. A control center 3 controls the operation of trains, aggregates position and speed information and operation information on the trains, collects information necessary for the operation of the trains, and serves as a subject of information distribution to the trains. Radio communication apparatuses 10 and 20 are radio base stations. The radio communication apparatuses 10 and 20 perform transmission of information between the radio communication apparatuses 10 and 20 and the control center 3 through a wired communication network 4 and perform transmission of information by radio between the radio communication apparatuses 10 and 20 and the radio communication apparatus 30 mounted on the train 1. The wired communication network 4 is set along a railroad track (the rail 2) and connects the radio base stations (the radio communication apparatuses 10 and 20) to each other or connects the radio base stations and the control center 3.

In FIG. 1, two stations are shown as the radio base stations. However, a necessary number of the radio base stations are set along the railroad track at necessary intervals in accordance with a radio communication distance so that communication with the train 1 (the radio communication apparatus 30 mounted on the train 1) is not interrupted. Between the radio base stations, it is assumed that timing synchronization is performed by carrying out timing synchronization processing via the wired communication network 4 or highly accurately managing time by, for example, including a GPS (global Positioning System) receiver or the like.

The radio communication apparatuses 10, 20, and 30 are the radio communication apparatus according to the present invention. All of the radio communication apparatuses 10, 20, and 30 have basically the same function. The train 1 notifies the radio communication apparatuses 10 and 20, which are the radio base stations, position information and speed information on the own train via the radio communication apparatus 30. The radio base stations transmit position information on other trains, control information including timing information, and the like to the train 1. The train 1 updates own system time using the timing information included in the control information transmitted from the radio base stations and performs timing synchronization between the train 1 and the radio base stations.

Figure 2:
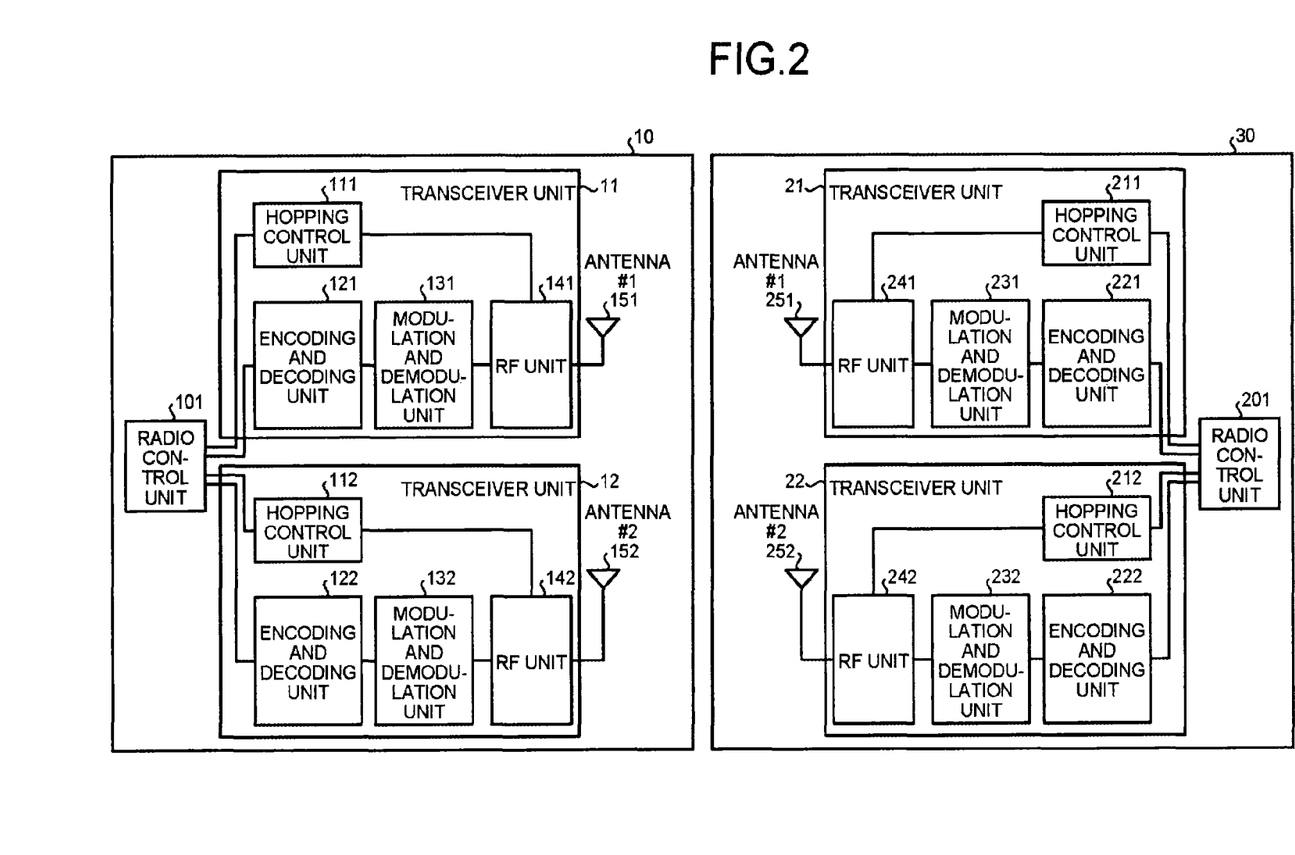
FIG. 2 is a diagram of a configuration example of radio communication apparatuses.

FIG. 2 is a diagram of a configuration example of the radio communication apparatuses in the present embodiment. In the example shown in FIG. 2, the radio communication apparatus 10 is a transmission side and the radio communication apparatus 30 is a reception side. That is, in FIG. 2, communication in a direction from the radio communication apparatus 10 to the train 1 along the railroad track is shown as an example. However, each unit is adapted to both of transmission and reception. A radio control unit 101, transceiver units 11 and 12, and antennas 151 and 152 of the radio communication apparatus 10 respectively have the same functions as functions of a radio control unit 201, transceiver units 21 and 22, and antennas 251 and 252 of the radio communication apparatus 30. The radio communication apparatus 20 has the same configuration as the configuration of the radio communication apparatus 10. Note that transmission processing and reception processing are carried out using common constituent elements as the transceiver units 11, 12, 21, and 22. However, the radio communication apparatuses each can separately include a transmission unit and a reception unit.

The transceiver unit 11 includes a hopping control unit 111, an encoding and decoding unit 121, a modulation and demodulation unit 131, and an RF (Radio Frequency) unit 141. The transceiver unit 12 includes a hopping control unit 112, an encoding and decoding unit 122, a modulation and demodulation unit 132, and an RF (Radio Frequency) unit 142. The transceiver unit 21 includes a hopping control unit 211, an encoding and decoding unit 221, a modulation and demodulation unit 231, and an RF (Radio Frequency) unit 241. The transceiver unit 22 includes a hopping control unit 212, an encoding and decoding unit 222, a modulation and demodulation unit 232, and an RF (Radio Frequency) unit 242. The hopping control units 111, 112, 211, and 212 have the same function. The encoding and decoding units 121, 122, 221, and 222 have the same function. The modulation and demodulation unit 131, 132, 231, and 232 have the same function. The RF units 141, 142, 241, and 242 have the same function.

During transmission, the encoding and decoding units 121, 122, 221, and 222 perform encoding processing, interleave, and the like for FEC (Forward Error Correction) on transmission data respectively transmitted from the radio control units 101 and 201. During reception, the encoding and decoding units 121, 122, 221, and 222 perform error correction processing and deinterleave on data after demodulation. During transmission, the modulation and demodulation units 131, 132, 231, and 232 perform modulation processing such as FSK (Frequency Shift Keying) on encoded data. During reception, the modulation and demodulation units 131, 132, 231, and 232 perform demodulation processing on modulated signals.

During transmission, the RF units 141, 142, 241, and 242 perform, with mixers, frequency conversion into an RF band on baseband signals output from the modulation and demodulation units 131, 132, 231, and 232, amplify the signals with transmission amplifiers, and output the signals. During reception, the RF units 141, 142, 241, and 242 perform filter processing and frequency conversion from the RF band into a baseband. During transmission, the antennas 151, 152, 251, and 252 radiate output signals from the RF units 141, 142, 241, and 242 to aerials. During reception, the antennas 151, 152, 251, and 252 receive signals of the aerials and output the signals to the RF units 141, 142, 241, and 242.

The hopping control units 111, 112, 211, and 212 are hopping control units that perform control of a carrier frequency according to hopping sequences retained on the insides. Note that the hopping sequences are agreed upon between the radio base stations and the train (between the radio communication apparatuses mounted on the radio base stations and the radio communication apparatus mounted on the train). A method of agreeing upon the hopping sequences can be any method. For example, a hopping sequence can be fixedly determined for each of the radio base stations. The train side can be configured to retain the position and the hopping sequence of each of the radio base stations and select and switch, on the basis of position information on the own train, a hopping sequence to be used. Alternatively, the radio base stations can be configured to change a hopping sequence according to the state of an interference source around the ratio base stations and transmit the hopping sequence to the train before the train enters the area of the radio base stations. The hopping sequences are determined such that frequency channels used in the same period do not overlap with each other between the radio base stations adjacent to each other.

The radio control units 101 and 201 include interfaces with the outside of the radio communication apparatuses 10 and 30. During transmission, the radio control units 101 and 201 receive, from the outside, data that should be transmitted. During reception, the radio control units 101 and 201 output received data to the outside. The radio control units 101 and 201 are radio control units that execute overall control related to radio communication, such as switching control and timing control during transmission, on the transceiver units 11, 12, 21, and 22.

Note that, in the example shown in FIG. 2, two sets of the antenna and the transceiver unit are provided on both of the transmission side and the reception side. However, each of the radio communication apparatuses can be configured by three or more sets of the antenna and the transceiver unit.

Operations in the present embodiment are explained. First, the operation of frequency hopping is explained. The radio communication apparatuses (the radio communication apparatuses 10, 20, and 30) in the present embodiment switch frequency channels in use at fixed time intervals. Specifically, hopping sequences in which frequency channel numbers in use are arranged in time series are retained inside the hopping control units 111, 112, 211, and 212. The hopping control units output the frequency channel numbers corresponding to the time to the RF units 141, 142, 241, and 242. The RF units 141, 142, 241, and 242 input signals having frequencies corresponding to the frequency channel numbers to the mixers for RF conversion to thereby realize the frequency hopping.

As explained above, the radio communication apparatus 10 of the radio base station and the radio communication apparatus 30 of the train 1 are synchronized in timing. The frequency hopping is performed in synchronization in the radio communication apparatus 10, the train, and the radio communication apparatus 30. As the time interval of the frequency hopping, the length enough for a transmission frame to be fit is assumed. During transmission, transmission control is performed taking into account timing until the next frequency hopping such that switching of hopping does not occur halfway in a frame.

Figure 3:
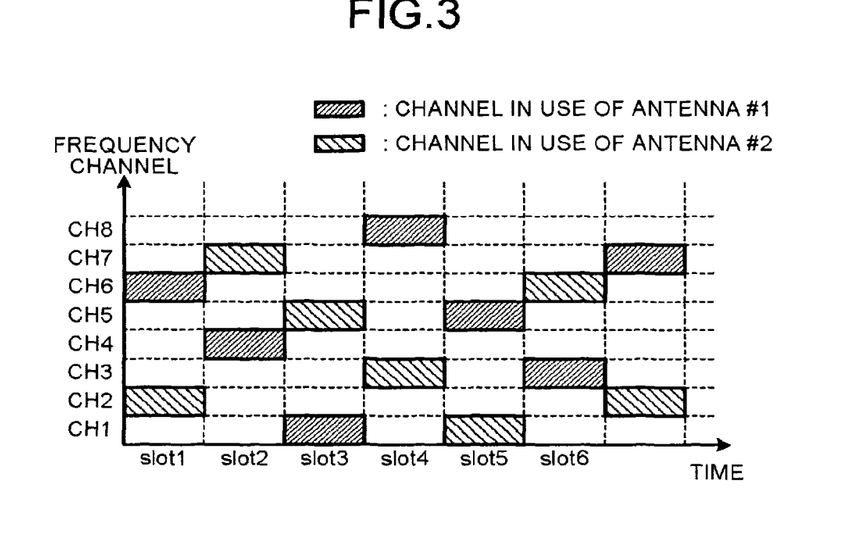
FIG. 3 is a diagram of an example of hopping sequences.

FIG. 3 is a diagram of an example of hopping sequences (switching of frequency channels) in the present embodiment. In the following explanation, the antennas 151 and 251 are represented as an antenna #1 and the antennas 152 and 252 are represented as an antenna #2. In FIG. 3, slot 1, slot 2, and the like indicate numbers of transmission slots (switching cycles of frequency channels). As shown in FIG. 3, in the antennas at the same hour, transmission is performed using different frequency channels. The hoping control units 111, 112, 211, and 212 retain different hopping sequences for the radio communication apparatuses, respectively. As explained above, the hopping sequences are determined such that frequency channels in use do not overlap with each other in the same period between the radio stations adjacent to each other.

The operation on the transmission side is explained with reference to FIG. 2. When the radio control unit 101 receives transmission data and a transmission request from a not-shown outside, after performing CCA (Clear Channel Assessment) processing (check processing for checking the idle state of a frequency channel) explained below, simultaneously with performing timing control, the radio control unit 101 passes the transmission data after the processing to the encoding and decoding units 121 and 122 and instructs the encoding and decoding units 121 and 122 to transmit the transmission data. The same transmission data is passed to the encoding and decoding units 121 and 122. The encoding and decoding units 121 and 122 receive the transmission data from the radio control unit and perform interleave after performing encoding processing such as convolution encoding. The modulation and demodulation units 131 and 132 carry out modulation processing on the transmission data after the interleave output from the encoding and decoding units 121 and 122.

In the following explanation, as an example, FSK modulation is performed as a modulation system. After performing digital filter processing on the outputs from the encoding and decoding units 121 and 122, the modulation and demodulation units 131 and 132 perform DA (Digital Analog) conversion and carry out the FSK modulation with a VCO (Voltage Controlled Oscillator).

The RF units 141 and 142 frequency-convert signals modulated by the modulation and demodulation units 131 and 132 into a carrier frequency band with the mixers in the RF units 141 and 142, thereafter amplify the signals with power amplifiers in the RF units, and radiate the signals to the aerials via the antennas 151 and 152. The carrier frequencies are frequencies corresponding to frequency channel numbers input from the hopping control units 111 and 112. The hopping control units 111 and 112 input, according to the retained hopping sequences, frequency channel numbers to the RF units 141 and 142 at fixed time intervals (switching cycles of frequency channels). The hopping control units 111 and 112 output frequency channel numbers different from each other at the same hour. Therefore, the antennas 151 and 152 output signals having different frequencies.

The transceiver units 11 and 12 perform the CCA processing on the basis of an instruction from the radio control unit 101 before transmission in each slot. The CCA is processing for realizing CSMA/CA (Carrier Sense Multiple Access/Collision Avoidance) and processing for evaluating the idle state of a transmission line before transmission and performing transmission to the transmission line only when it is determined that the transmission line is idle. Specifically, the transceiver units 11 and 12 determine the idle state of transmission lines through, for example, threshold determination using a reception signal level.

Figure 4:
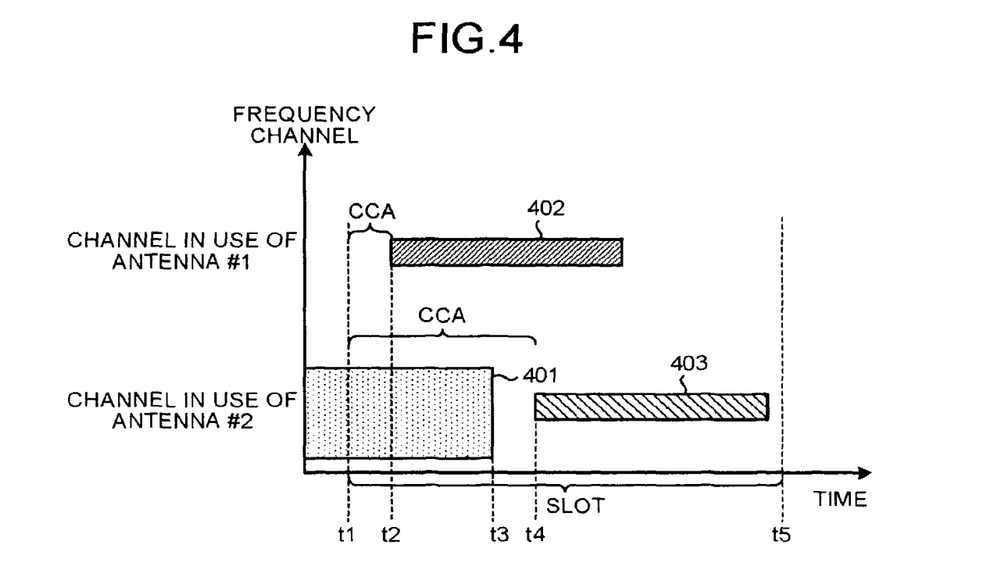
FIG. 4 is an explanatory diagram of an example of a transmission operation by CCA.

FIG. 4 is an explanatory diagram of an example of a transmission operation by the CCA. In FIG. 4, a period t1 to t5 indicates a transmission period unit (a slot). The radio control unit 101 performs timing control such that a transmission frame is completed within this period for each slot. In the example shown in FIG. 4, it is assumed that, in the slot of t1 to t5, a channel in use of the antenna #1 is not used by another radio system and a channel in use of the antenna #2 is used by another radio system during t1 to t3. The frequency hopping is performed in slot units or in units of a plurality of slots.

When a transmission request is generated, the radio control unit 101 instructs, concerning frequency channels for transmission by the antennas #1 and #2, the transceiver units 11 and 12 to start the CCA from t1 at the head of a slot. The transceiver units 11 and 12 perform evaluation of the idle state of transmission lines. Specifically, when the transceiver units 11 and 12 receive the start instruction for the CCA, the hopping control units 111 and 112 respectively instruct the RF units 141 and 142 about frequency channel numbers on the basis of the hopping sequences. The RF units 141 and 142 notify the radio control unit 101 of the idle state by determining whether radio signals having the instructed frequency channel numbers are received by the reception antennas #1 and #2 (e.g., reception power is equal to or larger than a threshold). Note that the RF units 141 and 142 can notify the radio control unit 101 of the reception power and the radio control unit 101 can determine whether the frequency channels are in the idle state. Determining that the transmission line is idle at the timing t2 in the channel in use of the antenna #1, the radio control unit 101 instructs the encoding and decoding unit 121 to transmit a frame 402 at the timing t2.

The radio control unit 101 also instructs the transceiver unit 12 to start the CCA from t1 in the channel in use of the antenna #2. However, because another interfering system performs transmission of a frame 401 until the timing t3, the transmission line is not in the idle state. Therefore, the transceiver unit 12 determines that, in the channel in use of the antenna #2, the transmission line is in the idle state at the timing t4 and instructs the encoding and decoding unit 122 to transmit a frame 403 at the timing t4. If the frame 401 of the other interfering system lasts longer and the radio control unit 101 determines that the frame 403 cannot be entirely transmitted within the period before the timing t5 (the transmission line does not change to the idle state before a predetermined time obtained by subtracting time required for transmission from the slot time elapses after the start of the CCA), the radio control unit 101 cancels transmission using this frequency channel (i.e., transmission in this slot).

On the other hand, in the radio communication apparatus 30 on the reception side, reception signals received by the antennas #1 and #2 are respectively subjected to gain adjustment by AGC (Automatic Gain Control), out-of-band suppression by a receive filter, and the like in the RF units 241 and 242, and are then frequency-converted into a baseband to be output to the modulation and demodulation units 231 and 232, respectively.

The frequency conversions in the RF units 241 and 242 are performed on the basis of the frequency channel numbers respectively output from the hopping control units 211 and 212. The hopping control units 211 and 212 select hopping sequences corresponding to a communication partner radio base station on the basis of the present position of the train 1. Switching of frequency channels in use is performed in synchronization with the radio communication apparatus 10. After performing AD (Analog Digital) conversion, the modulation and demodulation units 231 and 232 perform demodulation processing with discrete detection or the like. The modulation and demodulation units 231 and 232 also perform synchronization processing such as BTR (Bit Timing Recovery) and AFC (Automatic Frequency Control) in parallel. After carrying out deinterleave processing on a bit string after demodulation, the encoding and decoding units 221 and 222 perform error correction processing such as viterbi decoding on the bit string and output the bit string to the radio control unit 201.

The radio control unit 201 performs error detection by CRC (Cyclic Redundancy Check) or the like on demodulated data output from the transceiver units 21 and 22. The radio control unit 201 outputs, to a not-shown train control apparatus, demodulated data that can be demodulated without an error within a fixed time as reception data, and the train control apparatus performs speed control and operation control for the train 1 on the basis of the reception data.

The radio communication apparatus 30 mounted on the train 1 transmits position information, speed information, and the like on the own train to the radio communication apparatus 10 according to a method same as the method performed by the radio communication apparatus 10. The radio communication apparatus 10 performs reception processing same as the reception processing performed by the radio communication apparatus 30 on a radio signal received from the radio communication apparatus 30.

Note that, in the above example, the configuration in which the radio communication apparatus 30 is mounted on the train 1 is explained. However, the radio communication apparatus in the present embodiment is not limited to mounting of the radio communication apparatus 30 on the train 1. Data transmitted and received by the radio communication apparatus is not limited to the information for the operation of the train.

As explained above, the radio communication apparatus in the present embodiment is configured to transmit the same data from the different antennas with the hopping sequences different from each other. Therefore, a frequency diversity effect can be obtained and stable communication is possible. The radio communication apparatus is configured to perform transmission after checking the idle state of transmission lines by performing the CCA for each channel. Further, the radio communication apparatus is configured to perform transmission by using only a channel in which it can be determined that the transmission line is idle within the fixed period. Therefore, transmission is possible only if any channel among the frequency channels corresponding to the antennas is idle. Therefore, it is possible to perform communication with high transmission efficiency while avoiding collision with other interfering systems.

Second Embodiment

A radio communication method in a second embodiment according to the present invention is explained. The configurations of a radio communication system and a radio communication apparatus in the present embodiment are the same as the configurations in the first embodiment. Constituent elements having the same functions as the functions in the first embodiment are denoted by reference numerals and signs same as the reference numerals and signs in the first embodiment. Redundant explanation of the constituent elements is omitted. In the following explanation, differences from the first embodiment are explained.

In the present embodiment, an operation in the case of application of automatic retransmission control (ARQ: Automatic Repeat reQuest) is explained. In the present embodiment, the radio control unit 101 performs the CCA as in the first embodiment and carries out the automatic retransmission control.

Figure 5:
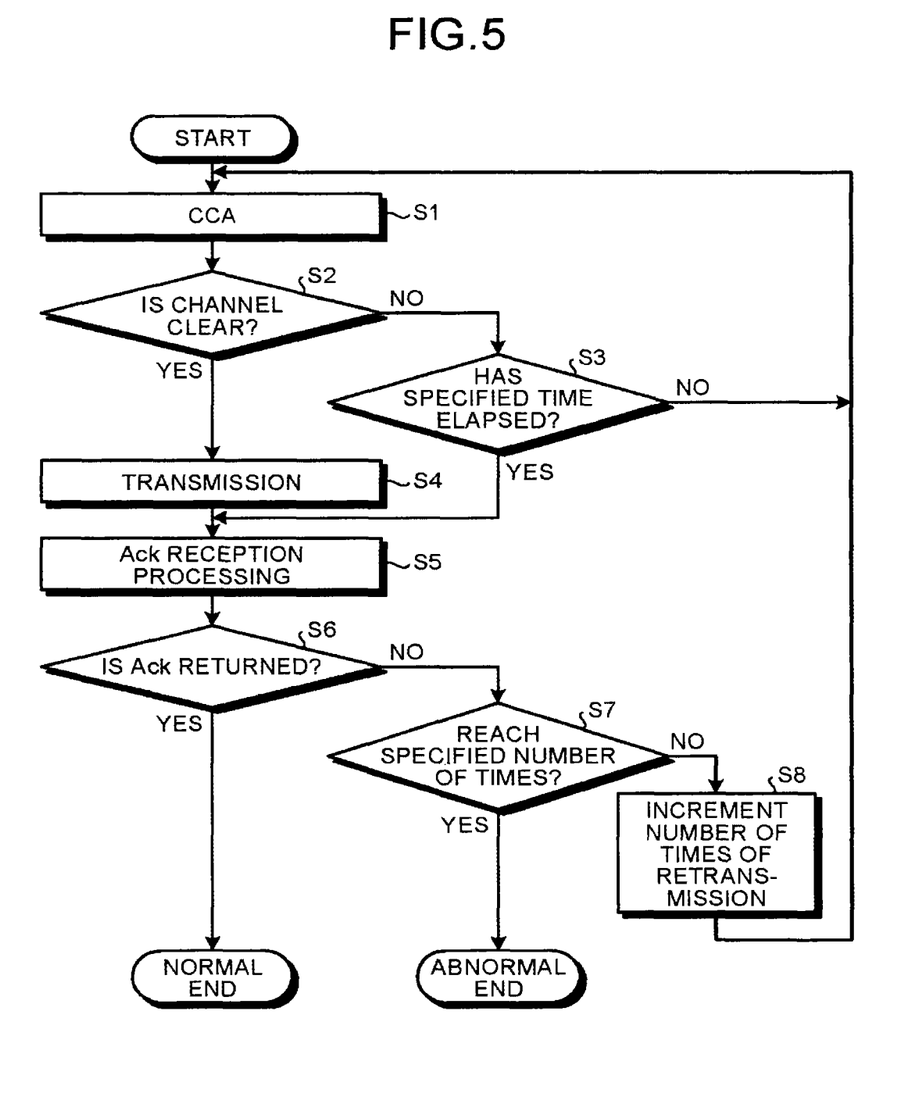
FIG. 5 is a flowchart illustrating an example of a transmission operation in a second embodiment.

FIG. 5 is a flowchart illustrating an example of a transmission operation in the present embodiment. When a transmission request is generated, the radio control unit 101 instructs the transceiver units 11 and 12 to perform the CCA (step S1). The transceiver units 11 and 12 determine, on the basis of hopping sequences, whether transmission lines of the frequency channels for transmission by the antennas #1 and #2 are in the idle state (clear) (step S2). When determining that the transmission lines are idle, that is, transmission or the like by another system does not occur (Yes at step S2), the transceiver units 11 and 12 carry out transmission processing (step S4). That is, steps S1, S2, and S4 are the same as the steps of the operation in the first embodiment.

On the reception side, in a frequency channel in which a frame from the transmission side can be correctly received, an Ack frame (a response signal) indicating that the frame can be correctly received is transmitted on the frequency channel in which the frame can be correctly received. After the transmission processing, the radio control unit 101 carries out Ack reception processing (step S5). At step S6, a period sufficient for receiving the Ack frame is decided in advance taking into account a round trip time between the radio communication apparatus and a communication partner, and the radio control unit 101 stands by for reception of the Ack frame during the period and, when the Ack frame is received, performs reception processing.

When determining at step S2 that the transmission lines are not idle (No at step S2), the radio control unit 101 determines whether a specified time has elapsed from the start of the CCA (step S3). When the specified time has not elapsed (No at step S3), the radio control unit 101 returns to step S1. In this case, as the specified time, on the basis of a slot time (time of one slot), a time period is set during which transmission is possible within the slot if transmission is performed before the lapse of the specified time taking into account an Ack return time and the like explained below. Note that step S3 is different from the first embodiment in that the Ack return time is taken into account (i.e., the specified time in the present embodiment is equal to or shorter than the predetermined time for determining whether transmission is performed in the first embodiment). However, as in the first embodiment, transmission is not carried out when the transmission line does not change to the idle state even if the CCA is performed and the time during which transmission is possible within the slot has elapsed.

When determining at step S3 that the specified time has elapsed (Yes at step S3), the radio control unit 101 does not perform transmission and proceeds to step S5. Note that, in this case, at step S5, the transceiver unit that cannot perform transmission because the transmission line is not idle in the processing at step S2 only has to wait for the period decided in advance.

When the period decided in advance has elapsed from the start of step S5, the radio control unit 101 checks whether Act is returned for any one or more signals transmitted on the frequency channels of the antennas #1 and #2 (step S6). When Ack for the signal transmitted on the frequency channel of one of the antennas #1 and #2 is returned (Yes at step S6), the radio control unit 101 normally ends the transmission processing.

When Act cannot be received on both the channels (No at step S6), the radio control unit 101 checks whether the number of times of retransmission has reached a specified number of times (step S7). When the number of times of retransmission has not reached the specified number of times (No at step S7), the radio control unit 101 increments the number of times of retransmission by one (step S8) and repeats the processing from step S1. When the number of times of retransmission has reached the specified number of times (Yes at step S7), the radio control unit 101 determines that the status is abnormal and ends (abnormally ends) the transmission processing. In this case, the radio control unit 101 can be configured to perform retransmission in a higher protocol layer. For example, when delivery cannot be frequently confirmed, it is possible to perform control such as emergency stop concerning train control. Note that operations in the present embodiment other than the operations explained above are the same as the operations in the first embodiment.

As explained above, as in the first embodiment, the radio communication apparatus according to the present embodiment performs transmission in the case where a frequency channel is idle when the CCA is performed and performs delivery check through retransmission control within the slot of the fixed time. Therefore, it is possible to confirm that a frame has surely reached the reception side. When delivery cannot be confirmed within the specified time, control corresponding thereto is possible. Therefore, it is possible to improve reliability of communication itself and it is possible to establish a system having high reliability. Further, the number of times of retransmission changes according to the state of the transmission line, that is, the line use ratio changes. Therefore, it is possible to efficiently use a transmission band.

INDUSTRIAL APPLICABILITY

As explained above, the radio communication apparatus, the radio communication system, and the radio communication method according to the present invention are useful for a radio communication system that performs frequency hopping.

REFERENCE SIGNS LIST

1 train, 2 rail, 3 control center, 4 wired communication network, 10, 20, 30 radio communication apparatus, 11, 12, 21, 22 transceiver unit, 111, 112, 211, 212 hopping control unit, 121, 122, 221, 222 encoding and decoding unit, 131, 132, 231, 232 modulation and demodulation unit, 141, 142, 241, 242 RF unit, 151, 152, 251, 252 antenna.

The invention claimed is:

1. A radio communication apparatus comprising:
a plurality of transceivers that are respectively connected to a plurality of antennas and switch a frequency channel in use in units of a switching cycle in synchronization with a communication partner,
wherein
a same transmission data is inputted to the transceivers, and every switching cycle the transceivers perform check processing for checking an idle state of the frequency channel used by the transceivers, and
the transceivers carry out the check processing for checking an idle state on the basis of a received instruction and, when determining that the frequency channel used by the transceivers is in an idle state before a first time, which is shorter than the switching cycle, elapses from a start of the check processing for checking an idle state, transmit the transmission data to the communication partner by using the frequency channel.

2. The radio communication apparatus according to claim 1, wherein
when a reception signal is correctly demodulated, the communication partner transmits a response signal to the reception signal on a frequency channel on which the reception signal is received, and
when a frequency channel does not change to an idle state in all the transceivers according to the check processing for an idle state within a second time, which is equal to or shorter than the first time, or when a response signal is not received on any frequency channel, the transceivers perform retransmission of the transmission data and, when a response signal is received on any one or more frequency channels, the transceivers stop retransmission on all frequency channels.

3. The radio communication apparatus according to claim 1, wherein the transceivers carry out error correction encoding processing on the transmission data.

4. The radio communication apparatus according to claim 1, wherein the radio communication apparatus is mounted on a train.

5. The radio communication apparatus according to claim 1, wherein the radio communication apparatus is an apparatus mounted on a radio base station connected to a control center that controls operation of a train, and the communication partner is an apparatus mounted on the train.

6. A radio communication system comprising a first radio communication apparatus and a second communication apparatus, wherein
the first radio communication apparatus includes:
a plurality of transceivers that are respectively connected to a plurality of antennas and switch a frequency channel in use in units of a switching cycle in synchronization with the second communication apparatus, wherein
a same transmission data is inputted to the transceivers, and every switching cycle, the transceivers perform check processing for checking an idle state of the frequency channel used by the transceivers,
the transceivers carry out the check processing for checking an idle state on the basis of a received instruction and, when determining that the frequency channel used by the transceivers is in an idle state before a first time, which is shorter than the switching cycle, elapses from a start of the check processing for checking an idle state, transmit the transmission data to the second radio communication apparatus by using the frequency channel, and
the second radio communication apparatus receives signals respectively transmitted from the transceivers of the first radio communication apparatus, carries out demodulation processing on the received signals, and uses, as reception data, data that is demodulated without an error during the switching cycle.

7. A radio communication method in a radio communication system including a first radio communication apparatus and a second radio communication apparatus each including a plurality of antennas, a plurality of transceivers that are respectively connected to a plurality of antennas, the radio communication method comprising:
instructing, by the first radio communication apparatus and in units of a switching cycle, the transceivers of the first radio communication apparatus to start check processing for checking an idle state of a frequency channel used by the transceivers of the first radio communication apparatus;
switching, by the first radio communication apparatus, a frequency channel in units of the switching cycle in synchronization with the second radio communication apparatus;
carrying out, by the first radio communication apparatus, the check processing for checking an idle state on the basis of the instructing and, when determining that the frequency channel used by the transceivers of the first radio communication apparatus is in an idle state before a first time, which is shorter than the switching cycle, elapses from a start of the check processing for checking an idle state, transmitting transmission data to the second radio communication apparatus by using the frequency channel; and
receiving, by the second radio communication apparatus, signals respectively transmitted from the transceivers of the first radio communication apparatus, carrying out demodulation processing on the received signals, and using, as reception data, data that is demodulated without an error during the switching cycle.

* * * * *